US012784273B2

(12) United States Patent
Doh et al.

(10) Patent No.: US 12,784,273 B2
(45) Date of Patent: Nov. 3, 2026

(54) APPARATUS AND METHOD FOR ESTIMATING USER POSE IN THREE-DIMENSIONAL SPACE

(71) Applicant: Korea University Research and Business Foundation, Seoul (KR)

(72) Inventors: Nak Ju Doh, Seoul (KR); Joohyung Kim, Goyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 352 days.

(21) Appl. No.: 18/413,649

(22) Filed: Jan. 16, 2024

(65) Prior Publication Data

US 2024/0354989 A1 Oct. 24, 2024

(30) Foreign Application Priority Data

Apr. 19, 2023 (KR) ........................ 10-2023-0051461

(51) Int. Cl.

| | |
|---|---|
| ***G06T 7/73*** | (2017.01) |
| ***G06V 10/74*** | (2022.01) |
| ***G06V 10/762*** | (2022.01) |

(52) U.S. Cl.

CPC .............. *G06T 7/75* (2017.01); *G06V 10/761* (2022.01); *G06V 10/762* (2022.01); *G06T 2200/04* (2013.01); *G06T 2207/20076* (2013.01)

(58) Field of Classification Search

CPC ................... G06T 7/75; G06T 2200/04; G06T 2207/20076; G06T 7/70; G06T 2207/10028; G06V 10/761; G06V 10/762; G06V 20/64; G06V 10/14; G06V 10/82; G06V 20/20; G06V 40/10; G06V 2201/12; G06N 3/08

(Continued)

(56) References Cited

FOREIGN PATENT DOCUMENTS

| | | | |
|---|---|---|---|
| KR | 10-2020-0037502 | A | 4/2020 |
| KR | 10-2021-0087680 | A | 7/2021 |

(Continued)

OTHER PUBLICATIONS

Simultaneous Tracking and Rendering: Real-time Monocular Localization for MAVs; Kyel Ok, W, Nicholas Greene, and Nicholas Roy; 2016 IEEE International Conference on Robotics and Automation (ICRA) Stockholm, Sweden, May 16-21, 2016. (Year: 2016).*

(Continued)

*Primary Examiner* — Charlotte M Baker
(74) *Attorney, Agent, or Firm* — NSIP Law

(57) ABSTRACT

Disclosed are an apparatus and a method for estimating a user pose in a three-dimensional space. The apparatus includes a relative pose identification unit configured to identify estimated relative pose information between a plurality of images acquired in a chronological order in a real space; and a user pose estimating unit configured to: acquire a three-dimensional space model constructed using spatial information including at least one of inertial information, depth information, and image information about the real space; generate estimated pose candidate information based on the acquired three-dimensional space model; associate the identified estimated pose candidate information and the estimated relative pose information with each other; and estimate the user pose based on the association result.

12 Claims, 11 Drawing Sheets

100

110

(58) Field of Classification Search
USPC .......................................................... 382/103
See application file for complete search history.

(56) References Cited

FOREIGN PATENT DOCUMENTS

| | | | | | |
|---|---|---|---|---|---|
| KR | 10-2296267 | B1 | | 8/2021 | |
| KR | 10-2387797 | B1 | | 4/2022 | |
| WO | WO-2022204854 | A1 | * | 10/2022 | ........... H04N 23/951 |

OTHER PUBLICATIONS

Stenborg, Erik, et al., "Using Image Sequences for Long-Term Visual Localization", 2020 International conference on 3D Vision (3DV), IEEE, 2020, (11 Pages in English).
Fu, Jiahui, et al., "A Multi-Hypothesis Approach to Pose Ambiguity in Object-Based SLAM", 2021 IEEE/RSJ International Conference on Intelligent Robots and Systems (IROS), IEEE, 2021, (8 Pages in English).
Liu, Liu, et al., "Cyberloc: Towards Accurate Long-term Visual Localization", arXiv preprint arXiv:2301.02403v1, Jan. 6, 2023, (17 Pages in English).
Korean Office Action Issued on Jul. 15, 2025, in Counterpart Korean Patent Application No. 10-2023-0051461 (7 Pages in English, 7 Pages in Korean).
Kim, Joohyung, et al. "CLoc: Confident Initial Estimation of Long-term Visual Localization Using a Few Sequential Images in Large-scale Spaces." IEEE Sensors Journal (Apr. 15, 2023).

* cited by examiner

600

610

APPARATUS AND METHOD FOR ESTIMATING USER POSE IN THREE-DIMENSIONAL SPACE

CROSS-REFERENCE TO RELATED APPLICATION

This application claims priority to and the benefit of Korean Patent Application No. 10-2023-0051461, filed on Apr. 19, 2023, the disclosure of which is incorporated herein by reference in its entirety.

BACKGROUND OF THE DISCLOSURE

1. Field of the Disclosure

The present disclosure relates to an apparatus and a method for estimating a user pose in a three-dimensional space. More specifically, the present disclosure relates to an apparatus and a method for estimating a user pose in a three-dimensional space in which three-dimensional spatial information constructed based on data acquired in a real space and user information sequentially acquired by a user device in a chronological order may be used to improve accuracy and robustness at which the user pose is estimated.

2. Description of the Related Art

As a scheme of estimating a user pose using image information and spatial information, conventionally, a scheme using visual information and a scheme using a mixture of geographic information and visual information have been widely used.

Spatial information that expresses a real space is constructed by acquiring visual information using a camera or an image measurement device with a similar operating principle to that of the camera, acquiring point cloud information using a lidar or a depth measurement device with a similar operating principle to that of the lidar, or acquiring color point cloud information using Kinect or an image depth measurement device with a similar operating principle to that of the Kinect, or a combination thereof. User information is acquired by the user in a similar way to the above listed way. The spatial information and the user information are compared with each other to estimate a user pose based on the comparison result.

However, the above conventional scheme has various problems as follows.

First, change in information resulting from a difference between a time-point at which data for constructing the spatial information is acquired, and a time-point at which sensor information on estimating the user pose is acquired may reduce accuracy at which the user pose is estimated.

The difference in the time-point may cause change in presence or absence of dynamic objects, change and movement of interiors or objects, and changes in brightness of the environment or lighting. These changes may reduce the similarity between the information and may reduce accuracy of the user pose estimation.

Second, the accuracy of user pose estimation may be reduced depending on an amount of information at the time-point at which the data constituting the spatial information is acquired.

Ideally, acquiring the data from all poses in a space increases the amount of information, thus making it easier to find data with high similarity to the information acquired by the user, thereby improving the accuracy.

However, in reality, the data is acquired in consideration of the acquisition time of the spatial information, processing capacity, and computational efficiency. This means that the amount of information may not be sufficient. Thus, due to information with low similarity, the accuracy of the pose estimation may be lowered.

Third, when using image information on the pose estimation, a single image may be used to lower the accuracy of the pose estimation.

Within the spatial information, there may be a plurality of data similar to the user's image information. When estimating the pose using the plurality of data with high similarity, a plurality of different pose candidates may be generated.

This causes the problem of having to select a random one among the plurality of pose candidates. In this regard, incorrect selection may reduce the accuracy of the pose estimation.

Therefore, there is an emerging need for a method of constructing the spatial information that may solve the existing problems that occur when estimating the user pose based on the spatial information as described above and a method for estimating the user pose using the method.

SUMMARY OF THE DISCLOSURE

A purpose of the present disclosure is to improve the accuracy and robustness at which the user pose is estimated by utilizing three-dimensional spatial information constructed based on data acquired in a real space and user information acquired sequentially in a chronological order by a user device.

A purpose of the present disclosure is to improve the stability at which the pose is estimated by acquiring data not only in small room-sized spaces but also in large-scale spaces such as airports, large-scale complex shopping malls, and outdoor road spaces and efficiently constructing the spatial information.

A purpose of the present disclosure is to improve the accuracy and robustness at which the user pose is estimated by using sensor information of the user device acquired in a chronological order including sequential image information in association with individual image information and spatial information to utilize a larger amount of information than that as may be obtained using a single image or a single piece of information.

A purpose of the present disclosure is to provide an apparatus and a method for estimating a user pose in a three-dimensional space which may be used in estimating the user pose in AR (Augmented Reality) and MR (Mixed Reality), and in estimating the user pose in autonomous robots, autonomous mobility, etc., and thus may contribute to commercialization and development of relevant technologies.

A first aspect of the present disclosure provides an apparatus for estimating a user pose in a three-dimensional space, the apparatus comprising: a relative pose identification unit configured to identify estimated relative pose information between a plurality of images acquired in a chronological order in a real space; and a user pose estimating unit configured to: acquire a three-dimensional space model constructed using spatial information including at least one of inertial information, depth information, and image information about the real space; generate estimated pose candidate information based on the acquired three-dimensional space model; associate the identified estimated pose candidate information and the estimated relative pose information with each other; and estimate the user pose based on the association result.

In one implementation of the apparatus, the user pose estimating unit is configured to: calculate a similarity between the image information constituting the three-dimensional space model and the plurality of images; construct an image cluster based on the calculated similarity; match features corresponding to the image cluster with features of one image among the plurality of images; generate pose candidates from poses estimated via the feature matching on each image cluster; and generate the estimated pose candidate information on the generated pose candidates.

In one implementation of the apparatus, the user pose estimating unit is configured to: associate the estimated relative pose information and the estimated pose candidate information with each other to generate a pose hypothesis set; calculate a probability and/or a score from the generated pose hypothesis set; and estimate the user pose based on the calculated probability and score.

In one implementation of the apparatus, the user pose estimating unit is configured to: establish a scale hypothesis as an actual measurement ratio of a local map, using local map information based on the estimated relative pose information and feature matching information based on the estimated pose candidate information; and generate the pose hypothesis set in consideration of convergence on each of the plurality of images with respect to the established scale hypothesis.

In one implementation of the apparatus, the user pose estimating unit is configured to generate: a first pose hypothesis set in which one pose candidate among a plurality of pose candidates related to a first image among the plurality of images is selected, one pose candidate among a plurality of pose candidates related to a second image among the plurality of images is selected, and one pose candidate among a plurality of pose candidates related to a last image among the plurality of images is selected; and a second pose hypothesis set in which another pose candidate other than the one pose candidate among the plurality of pose candidates related to the first image among the plurality of images is selected, another pose candidate other than the one pose candidate among the plurality of pose candidates related to the second image among the plurality of images is selected, and another pose candidate other than the one pose candidate among the plurality of pose candidates related to the last image among the plurality of images is selected.

In one implementation of the apparatus, the spatial information is acquired using at least one of a depth measurement device, an image acquisition device, a wireless communication device, an inertial device, or a position information measurement device.

In one implementation of the apparatus, the three-dimensional space model reconstructs a pose or 3-dimensional point cloud data of a device having acquired the spatial information, and uses a global feature expressing an image included in the plurality of features in a form of information, a local feature including keypoint information, and three-dimensional information, wherein the three-dimensional information includes at least one of a three-dimensional position, an orientation, a normal direction, or semantic information.

In one implementation of the apparatus, the estimated relative pose information is generated by: estimating a relative pose from the plurality of images based on a 3D local map constructed using a local feature as keypoint information between the plurality of images; defining an origin and an orientation of a relative coordinate system; and selectively estimating a relative pose to a keyframe selected relative to the plurality of images.

A second aspect of the present disclosure provides a method for estimating a user pose in a three-dimensional space, the method comprising: identifying, by a relative pose identification unit, estimated relative pose information between a plurality of images acquired in a chronological order in a real space; acquiring, by a user pose estimating unit, a user pose estimating unit a three-dimensional space model constructed using spatial information including at least one of inertial information, depth information, and image information about the real space: generating, by the user pose estimating unit, estimated pose candidate information based on the acquired three-dimensional space model; associating, by the user pose estimating unit, the identified estimated pose candidate information and the estimated relative pose information with each other; and estimating, by the user pose estimating unit, the user pose based on the association result.

In one implementation of the method, generating, by the user pose estimating unit, the estimated pose candidate information includes: calculating a similarity between the image information constituting the three-dimensional space model and the plurality of images; constructing an image cluster based on the calculated similarity; matching features corresponding to the image cluster with features of one image among the plurality of images; generating pose candidates from poses estimated via the feature matching on each image cluster; and generating the estimated pose candidate information on the generated pose candidates.

In one implementation of the method, associating, by the user pose estimating unit, the identified estimated pose candidate information and the estimated relative pose information with each other, and estimating, by the user pose estimating unit, the user pose based on the association result include: associating the estimated relative pose information and the estimated pose candidate information with each other to generate a pose hypothesis set; calculating a probability and/or a score from the generated pose hypothesis set; and estimating the user pose based on the calculated probability and score.

In one implementation of the method, generating the pose hypothesis set includes: establishing a scale hypothesis as an actual measurement ratio of a local map, using local map information based on the estimated relative pose information and feature matching information based on the estimated pose candidate information; and generating the pose hypothesis set in consideration of convergence on each of the plurality of images with respect to the established scale hypothesis.

In one implementation of the method, generating the pose hypothesis set includes: generating a first pose hypothesis set in which one pose candidate among a plurality of pose candidates related to a first image among the plurality of images is selected, one pose candidate among a plurality of pose candidates related to a second image among the plurality of images is selected, and one pose candidate among a plurality of pose candidates related to a last image among the plurality of images is selected; and generating a second pose hypothesis set in which another pose candidate other than the one pose candidate among the plurality of pose candidates related to the first image among the plurality of images is selected, another pose candidate other than the one pose candidate among the plurality of pose candidates related to the second image among the plurality of images is selected, and another pose candidate other than the one pose candidate among the plurality of pose candidates related to the last image among the plurality of images is selected.

In one implementation of the method, the estimated relative pose information is generated by: estimating a relative pose from the plurality of images based on a 3D local map constructed using a local feature as keypoint information between the plurality of images; defining an origin and an orientation of a relative coordinate system; and selectively estimating a relative pose to a keyframe selected relative to the plurality of images.

The apparatus and the method for estimating the user pose in a three-dimensional space according to the present disclosure may improve the accuracy and robustness at which the user pose is estimated by utilizing three-dimensional spatial information constructed based on data acquired in a real space and user information acquired sequentially in a chronological order by a user device.

The apparatus and the method for estimating the user pose in a three-dimensional space according to the present disclosure may improve the stability at which the pose is estimated by acquiring data not only in small room-sized spaces but also in large-scale spaces such as airports, large-scale complex shopping malls, and outdoor road spaces and efficiently constructing the spatial information.

The apparatus and the method for estimating the user pose in a three-dimensional space according to the present disclosure may improve the accuracy and robustness at which the user pose is estimated by using sensor information of the user device acquired in a chronological order including sequential image information in association with individual image information and spatial information to utilize a larger amount of information than that as may be obtained using a single image or a single piece of information.

The apparatus and the method for estimating the user pose in a three-dimensional space according to the present disclosure may be used in estimating the user pose in AR (Augmented Reality) and MR (Mixed Reality), and in estimating the user pose in autonomous robots, autonomous mobility, etc., and thus may contribute to commercialization and development of relevant technologies.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1A:
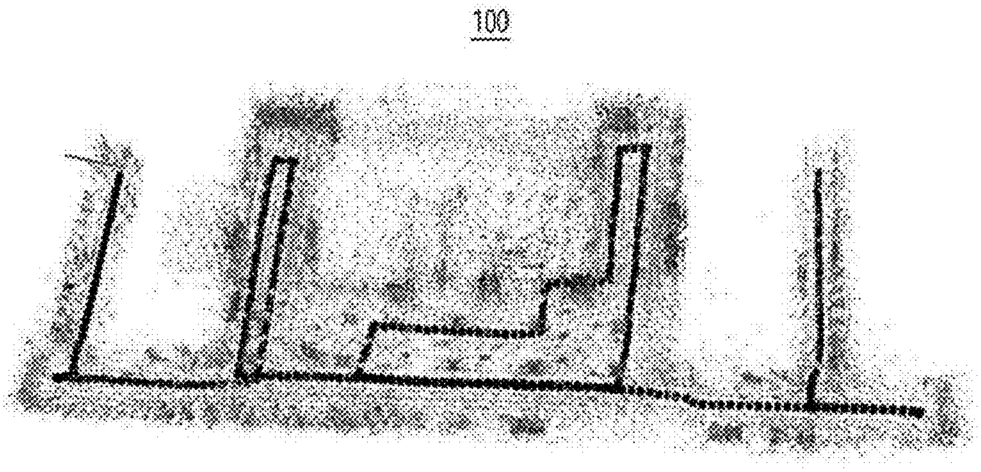
FIG. 1A and FIG. 1B are diagrams for illustrating a three-dimensional space model including three-dimensional spatial information according to an embodiment of the present disclosure.

Specific structural and functional descriptions of embodiments according to the concept of the present disclosure disclosed herein are merely illustrative for the purpose of explaining the embodiments according to the concept of the present disclosure.

Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present disclosure.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
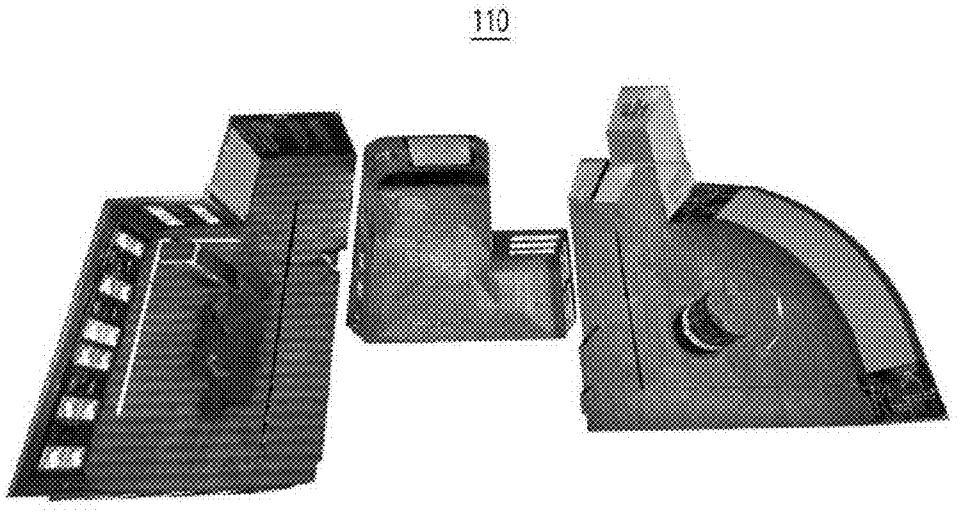

FIG. 1A and FIG. 1B are diagrams for illustrating a three-dimensional space model including three-dimensional spatial information according to an embodiment of the present disclosure.

FIG. 1A shows a resulting image 100 generated via a SfM method, and FIG. 1B shows a resulting image 110 generated via a SLAM method.

Each of an image 100 and an image 110 is spatial information and may include information as a virtual reconstruction of a real space constructed using image or depth-image combined information.

Furthermore, spatial information may include a model in which obj, x3d, etc. are generated or a TeeVR model.

To construct a 3D virtual space model, a background part may be utilized in a distinguished manner between the background part and a non-background part.

In addition, the 3D virtual space model is a concept that includes both an indoor space and an outdoor space, and may be an independent indoor space, an independent outdoor space, or a space where indoors and outdoors are connected to each other.

Models (people, objects, etc.) such as obj, x3d, etc. may be added to the 3D virtual space model. The 3D virtual space model may be a concept including the 3D virtual space model to which the model is added. A 2D virtual space model may be used as the model included in the spatial information.

The three-dimensional space model may employ a pre-constructed model such as obj and x3d. The space data may be acquired to construct the three-dimensional space model which may be used. The pre-constructed model may be updated and used.

The three-dimensional space model may be determined to be similar to a real space, and the user information includes visual information, and may be obtained using one or more image measurement devices. The user information may be acquired using a depth measurement device or additional device.

The user information may be acquired with a single or plurality of image sensors (cameras, etc.), and may be acquired in a form of a pin-hole model or fisheye lens.

The use information may be acquired as single visual information, visual information acquired chronologically or sequentially, or a combination thereof. The acquired user information may be used to construct visual information, depth information, or depth-image combined information.

For example, a single image measurement device may be used to acquire visual information, such as an image.

Depth information may be calculated using the sequentially acquired visual information (image), and thus, combined information between a depth and a visual may be constructed.

For example, when using the plurality of image measurement devices, the depth information may be calculated by utilizing the visual information acquired from each image measurement device and a relationship between the image measurement devices, and thus, the depth-image combined information may be constructed.

The relationship between the image measurement devices may be calibration information between image measurement devices or conversion information (homography matrix) between image information acquired from each image measurement device.

For example, when using at least one image measurement device and at least one depth measurement device, the depth-image combined information may be configured using calibration information between the two devices.

The depth information may be extracted from the visual information using a depth prediction deep learning model. A large amount of data for training and testing may be required.

Iterative learning may be performed, and parameter tuning may be required. The depth-image combined information may be constructed using the depth information extracted with a depth prediction model.

Processed visual information obtained by processing the visual information may be used. For example, changing a brightness, a saturation, etc. of an image, or converting a panoramic image into a rectified image may be performed.

User additional information may refer to information that may help estimate the user's pose in addition to the visual information acquired by the user, and may include inertial information (inertial measurement unit, IMU), odometry (odometry), etc.

In an example, when the inertial information may be acquired using an inertial measurement device, the inertial information may be used as predicted information about a pose at which the image is obtained when processing the visual information to make correction of the pose at which the image is obtained easier.

Furthermore, an actual movement distance may be predicted using an acceleration value or angular velocity value of the inertial information, and may be used to correct a scale of the depth information extracted from a single or plurality of image measurement device.

The odometry may be predicted using VO (Visual Odometry) and VIO (Visual Inertial Odometry), which are constructed based on the visual information acquired by the user. When the user information is acquired by attaching a measurement device to a wheeled mobile robot, the odometry may be the odometry of the mobile robot.

The odometry may be derived from the inertial information, or the inertial information may be used to correct the odometry extracted by the above methods.

Furthermore, it may be used to estimate or correct the odometry via an absolute pose received from a GPS or GNSS sensor.

A relative pose between sequentially acquired images may be expressed using the odometry.

More precisely, when each image is acquired, the pose of the image acquisition device may be expressed using the odometry.

Figure 2:
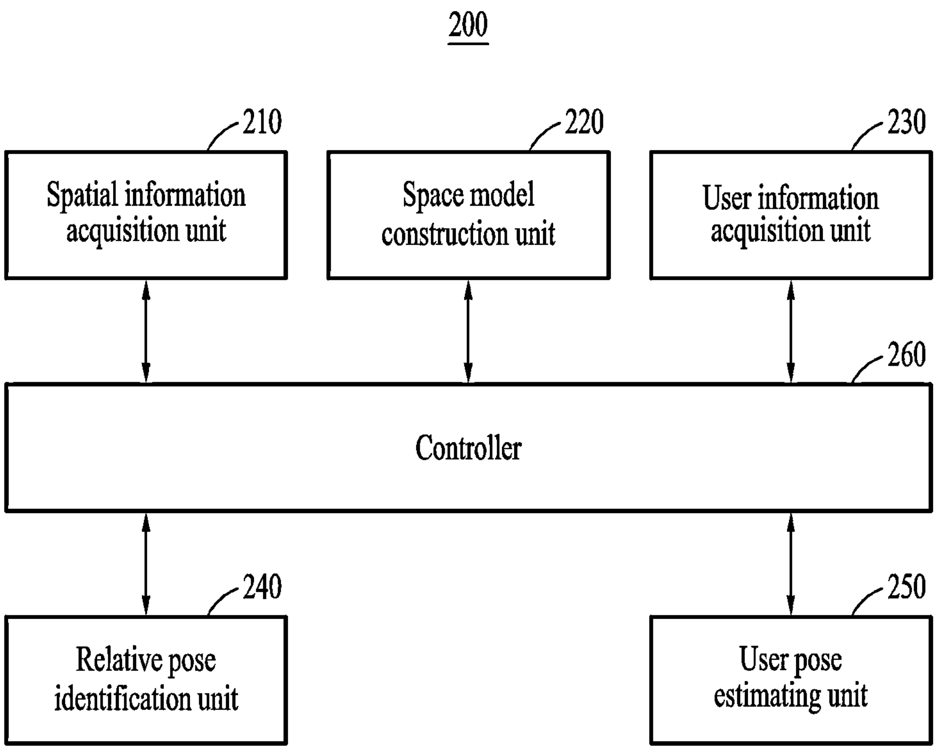
FIG. 2 is a diagram for illustrating a device for estimating a user pose in a three-dimensional space according to an embodiment of the present disclosure.

FIG. 2 is a diagram for illustrating a device for estimating a user pose in a three-dimensional space according to an embodiment of the present disclosure.

FIG. 2 illustrates components of a device for estimating a user pose in a three-dimensional space according to an embodiment of the present disclosure.

Referring to FIG. 2, a device 200 for estimating the user pose in a three-dimensional space according to an embodiment of the present disclosure includes a relative pose identification unit 240, a user pose estimating unit 250, and a controller 260.

In one example, the device 200 for estimating the user pose in three-dimensional space may further include a spatial information acquisition unit 210, a space model construction unit 220, and a user information acquisition unit 230.

For example, the spatial information acquisition unit 210 may be a component that acquires spatial information from a device that acquires the spatial information.

In one example, the space model construction unit 220 may be a component that receives the spatial information from the device that acquires the spatial information, and constructs a space model based on the received spatial information.

Furthermore, the user information acquisition unit 230 may be a component that acquires user information from a device that acquires the user information.

The controller 260 controls the components of the device 200 for estimating the user pose, and may include at least one processor that controls a display, a sensor, and a communication component.

According to one embodiment of the present disclosure, the device 200 for estimating the user pose may improve the accuracy and robustness at which the user pose is estimated by utilizing the three-dimensional spatial information constructed based on data acquired in the real space and the user information sequentially acquired by the user device in a chronological order.

According to one embodiment of the present disclosure, the spatial information acquisition unit 210 may acquire the spatial information including at least one of the inertial information, the depth information, and the image information about the real space.

In one example, the spatial information acquisition unit 210 may acquire the spatial information using at least one of a depth measurement device, an image acquisition device, a wireless communication device, an inertial device, and a position information measurement device.

According to one embodiment of the present disclosure, the space model construction unit 220 may construct a three-dimensional space model including three-dimensional information about a plurality of features using the spatial information.

For example, the three-dimensional space model corresponds to the real space.

In one example, the space model construction unit 220 may reconstruct the pose or 3D point cloud data of the device that has acquired the spatial information, and may use a global feature that expresses images included in the plurality of features in a form of information, a local feature that includes keypoint information, and 3D information.

The 3D information may include at least one of 3D position, orientation, normal direction, and semantic type information.

According to one embodiment of the present disclosure, the user information acquisition unit 230 may acquire user information including a plurality of images in a chronological order based on the user device in the real space.

In one example, the user information acquisition unit 230 may acquire sequential spatial information using at least one of a depth measurement device, an image acquisition device, a wireless communication device, an inertial device, and a position information measurement device.

According to one embodiment of the present disclosure, the user information acquisition unit 230 may use the plurality of images as supplementary information to the 3D information, and may select a keyframe for the plurality of images.

According to one embodiment of the present disclosure, the relative pose identification unit 240 may estimate the relative pose between the plurality of images to generate estimated relative pose information.

In one example, the relative pose identification unit 240 may construct a 3D local map using local features as keypoint information between the plurality of images, and may estimate a relative pose from the plurality of images, and may define an origin and an orientation of a relative coordinate system, and may selectively estimate the relative pose to a keyframe.

In one example, the estimated relative pose information may be generated by estimating the relative pose from the plurality of images based on the 3D local map constructed using the local features as the keypoint information between the plurality of images, and defining the origin and the orientation of the relative coordinate system, and by selectively estimating the relative pose to the keyframe selected relative to the plurality of images.

For example, the relative pose identification unit 240 may be a component that acquires and identifies the relative pose information received from a relative pose estimating device that estimates the relative pose.

According to one embodiment of the present disclosure, the user pose estimating unit 250 may generate estimated pose candidate information based on the constructed three-dimensional space model, may generate a pose hypothesis set by associating the identified estimated pose candidate information and the estimated relative pose information with each other, and may estimate the user pose using the generated pose hypothesis set.

In one example, the user pose estimating unit 250 may calculate a similarity between image information constituting the three-dimensional space model and the plurality of images, and may construct an image cluster based on the calculated similarity, and may match features corresponding to the image cluster and features of one image among the plurality of images with each other, and may generate pose candidates from poses estimated via the feature matching on each cluster, and may generate the estimated pose candidate information on the generated pose candidates.

According to one embodiment of the present disclosure, the user pose estimating unit 250 may generate a pose hypothesis set based on the estimated relative pose information and the estimated pose candidate information, and may calculate a probability and/or a score from the generated pose hypothesis set, and may estimate the user pose based on the calculated probability and score.

In one example, the user pose estimating unit 250 may establish a scale hypothesis as an actual measurement ratio of the local map, using local map information based on the estimated relative pose information and feature matching information based on the estimated pose candidate information, and may generate a pose hypothesis set in consideration of convergence on each of the plurality of images with respect to the established scale hypothesis.

The user pose estimating unit 250 may generate a first pose hypothesis set in which one pose candidate among a plurality of pose candidates related to a first image among the plurality of images is selected, one pose candidate among a plurality of pose candidates related to a second image among the plurality of images is selected, and one pose candidate among a plurality of pose candidates related to a last image among the plurality of images is selected.

The user pose estimating unit 250 may generate a second pose hypothesis set in which another pose candidate other than the one pose candidate among the plurality of pose candidates related to the first image among the plurality of images is selected, another pose candidate other than the one pose candidate among the plurality of pose candidates related to the second image among the plurality of images is selected, and another pose candidate other than the one pose candidate among the plurality of pose candidates related to the last image among the plurality of images is selected.

Therefore, the method and apparatus according to the present disclosure may estimate the user pose by utilizing the three-dimensional spatial information constructed based on the data acquired in the real space and the user information acquired by the user.

Furthermore, the method and apparatus according to the present disclosure may improve the stability at which the pose is estimated by acquiring the data not only in small room-sized spaces but also in large-scale spaces such as airports, large-scale complex shopping malls, and outdoor road spaces, and efficiently constructing the spatial information.

In acquiring the data to construct the three-dimensional spatial information, the spatial information acquisition unit 210 may acquire the spatial information using an image acquisition device or via a device linked to the depth acquiring device.

When the spatial information (database) is acquired in a path through which the real space can be secured under a field of view (FoV) of a measurement device including a camera or an image acquisition device with a similar operating principle to an operating principle thereof, a lidar or a depth measurement device with a similar operating principle to an operating principle thereof, the three-dimensional spatial information may be constructed in a similar manner to the real space, and a spatial information acquisition time, a spatial information capacity, and a data processing rate may be reduced, which may be efficient.

The visual information may be a two-dimensional image of a three-dimensional space and may have a form which can be expressed using a basis vector with two or three degrees of freedom. Regarding the image information, the camera may acquire an image as two-dimensional or three-dimensional data, or an infrared filter may be attached to the camera to express 3D information in a 2D manner.

The depth information has a point form that can be expressed using a basis vector with three degrees of freedom and may be acquired using a depth measurement device.

The relative pose identification unit 240 and the user pose estimating unit 250 may estimate the depth information using two or more images taken in different places.

Examples of the depth information measured using the depth measurement device connected to the user information acquisition unit 230 include depth information as acquired using LiDAR, SONAR, InfraRed, and TOF (Time Of Flight) distance detectors.

Examples of the depth information estimated using two or more images taken in different places include depth information acquired using stereo cameras, multi-cameras, omnidirectional stereo cameras, etc.

In one example, the depth information and the visual information may be acquired simultaneously using devices such as Kinect, JUMP, PrimeSense, and Project Beyond For example, the user pose estimating unit 250 may use the depth information acquired via the depth measurement device as well as newly estimate depth information via interpolation and use the estimate depth information.

More specifically, three or more depth information may be selected from a plurality of depth information as acquired and a polygonal (including a triangle) mesh may be constructed using the selected three or more depth information, and then new depth information may be estimated via interpolation and then may be added to inside the polygonal mesh.

In one example, the depth information and the visual information as acquired according to one embodiment of the present disclosure may be acquired simultaneously using an integrated sensor device (system).

When using multiple measurement devices, a calibration process to determine a coordinate relationship between sensors may be necessary.

In a process of acquiring the spatial data, the inertial measurement device may be additionally used. When a sensor is attached to a wheeled mobile robot to measure the spatial data, the odometry (odometry) may be used.

When the real space is wider than the viewing angle of the measurement device, the spatial data may be acquired by rotating and/or moving the sensor.

In this regard, three-dimensional poses at which individual space data are acquired may be different from each other. The techniques such as SfM (Structure from Motion), SLAM (Simultaneous Localization And Mapping), image-inertial odometry (VIO, Visual Inertial Odometry), and visual odometry (VO, Visual Odometry) may be utilized to predict the pose at which individual space data is acquired.

In this regard, the pose is a concept that includes both a position and an orientation.

In other words, the apparatus for estimating the user pose estimates the user pose including the position and the orientation of the measurement device that collects data such as images in a three-dimensional coordinate system based on information including the images in the real space.

In one example, before performing SfM, initial pose information for SfM may be generated by performing SLAM. SfM may be performed using the initial pose information, such that the spatial information may be stably constructed in various environmental spaces.

In one example, a construction of the spatial information may vary depending on the type of the measurement device.

For example, when the measurement device is composed of only a single camera, pre-measurement information is composed of camera visual information. In case of a single camera, a relative distance between pixels may be predicted using the visual information. In case of a plurality of cameras, an absolute distance between pixels using the visual information.

In particular, in case of the single camera, the depth of the pixel may be predicted using the accumulated visual information without extracting a keypoint. In case of the plurality of cameras, the depth of the pixel may be predicted using the plurality of camera images, or accumulated visual information thereof.

Furthermore, when the additional information such as the depth information and the inertial information are used together with the visual information, the spatial information may be processed according to the unique characteristics of each measurement device.

For example, when the inertial information can be acquired using the inertial measurement device, the inertial information may be used to improve SLAM performance, or may be used as information used to predict an image acquisition point when processing the visual information, such that correction on the image acquisition point may be made easier.

Furthermore, an actual moving distance may be predicted using the acceleration value or angular velocity value of the inertial information, and may be used to correct a scale of the depth information extracted from a single camera or a plurality of cameras.

The data as acquired to construct the three-dimensional spatial information is acquired at a partial pose of the real space. Ideally, all data within the three-dimensional space may be acquired by acquiring data from all positions and orientations within the three-dimensional space. However, in reality, this is not possible. The data is acquired at a partial pose of the real space.

Additional data may be artificially synthesized or generated and used as spatial information. In one example, artificial data may be synthesized or generated using technologies such as NeRF (Neural Radiance fields) to generate data at a pose other than the pose at which the spatial data has been acquired.

Furthermore, for the same purpose, a virtual space model may be constructed and data of a desired pose within the model may be synthesized or generated. Thus, corresponding information similar to the spatial information may be generated at the pose at which the spatial data has not been acquired.

The three-dimensional spatial information may include feature information extracted from the image used when constructing the spatial information.

The feature information may include local feature information or keypoint information.

The local feature information may include an index, ID, a position on the image, a descriptor or a position in the three-dimensional space of the local feature, or a combination thereof.

The descriptor of the local feature may be information in a form of a 1-dimensional vector, a 2-dimensional matrix, or a tensor of 3 or higher dimensions.

In addition, the local feature information may further include information such as orientation information, normal direction, or semantic information of the local feature. Furthermore, the local feature information may further include each local feature in the spatial information and a plurality of image information including one or more images obtained by imaging the local feature.

Furthermore, the feature information of the spatial information may include a global feature that expresses an image as a single piece of information.

The global feature may be information in a form of a 1-dimensional vector, a 2-dimensional matrix, or a tensor of 3 or higher dimensions.

The pose in the three-dimensional space of the global feature may be expressed as a pose at which the image is acquired.

The spatial information may further include covisibility information between images constituting the spatial information.

The covisibility information represents image pairs with an observable area overlapping with each other in a space, and may be used as information to indicate the other image having an observable area overlapping with that of one image.

The covisibility may be derived from the result of SfM or SLAM. The three-dimensional spatial information may be constructed by adding additionally acquired spatial information to previously constructed information. Pre-constructed spatial information may be updated and used.

According to the present disclosure, the pose may be estimated in a stable manner by acquiring the data not only in small room-sized spaces but also in large-scale spaces such as airports, large-scale complex shopping malls, and outdoor road spaces, and efficiently constructing the spatial information.

The spatial information commonly used in estimating the pose includes feature information. In this regard, it is important to ensure that the 3D information is well reconstructed.

A general reconstruction method may fail to reconstruct a large space. However, when an image acquisition device and a depth acquisition device such as LiDAR when necessary are used, the large-scale space reconstruction can be achieved, and more efficient and accurate information may be used as the spatial information. This contributes to enabling more efficient and accurate pose estimation.

The method and the apparatus according to the present disclosure may improve the accuracy and robustness at which the pose is estimated by using the sequential image information.

Using the sensor information of the user device acquired in a chronological order, including sequential image information, in association with individual image information and spatial information may allow a larger amount of information to be obtained than an amount of information that may be obtained via a single image information or a single piece of information.

Using the larger amount of information may increase the possibility of finding distinguishable and special information and may allow the pose to be estimated in a robust manner against environmental change.

For example, the sequential information may be classified into information such as dynamic objects/objects/interiors/lighting which are sensitive to the change and information such as background/structure which is robust against the change. The robustness and accuracy may be improved by estimating the pose using the robust information.

Furthermore, the apparatus and the method according to the present disclosure may overcome the uncertainty at which the pose is estimated that may occur when the pose is estimated using only a small amount of information, for example, using a single image.

Finding information significantly similar to the user information in the spatial information is a way to reduce the uncertainty.

In this regard, when the pose is estimated using a single or small number of sensor information, such as a single image, it may be difficult to infer true information among spatial information having high similarity, thereby causing the uncertainty.

However, when using the user sensor information acquired in a chronological order, spatial information with high similarity may be distinguished from each other, thereby reducing the uncertainty.

Furthermore, the apparatus and the method according to the present disclosure may improve the success probability and precision at which the pose is estimated. The precision may be defined as a percentage of the estimated pose that falls within a certain error range.

Thus, the user may determine based on the precision that the pose is estimated correctly. According to the present disclosure, the information acquired in the chronological order, including sequential images may be used. Thus, the pose may be estimated at low uncertainty, and in a robust manner, thereby increasing the success probability and precision at which the pose is estimated.

Therefore, the apparatus and the method for estimating the user pose in a three-dimensional space according to the present disclosure may be used in estimating the user pose in AR (Augmented Reality) and MR (Mixed Reality), and in estimating the user pose in autonomous robots, autonomous mobility, etc., and thus may contribute to commercialization and development of relevant technologies.

Figure 3:
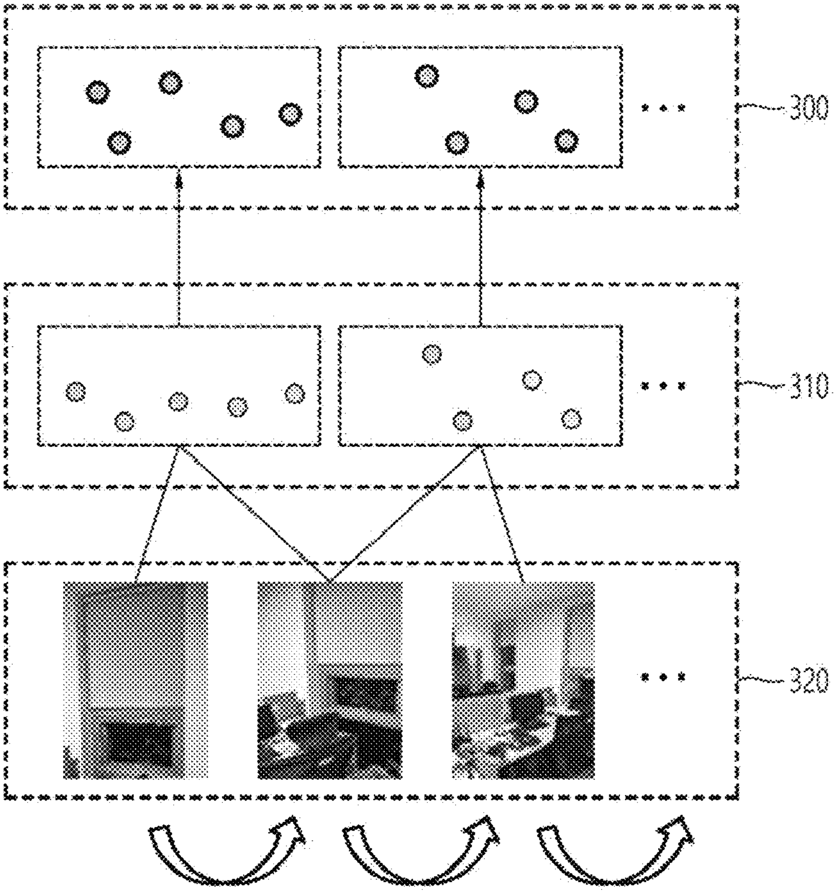
FIG. 3 is a diagram illustrating a method for associating a local map based on relative pose information and three-dimensional spatial information with each other according to an embodiment of the present disclosure.

FIG. 3 is a diagram illustrating a method for associating a local map based on relative pose information and three-dimensional spatial information with each other according to an embodiment of the present disclosure.

The apparatus and the method for estimating the user pose in a three-dimensional space according to the present disclosure may estimate the relative pose related to all acquired images, and may select a key frame and estimate the relative pose only to the key frame.

For the relative pose estimation, initialization may be performed with initially input user information and the origin and the orientation of the relative coordinate system may be defined.

Based on specific information from the user information accumulated and input in a chronological order, the origin and the orientation of the relative coordinate system may be defined and the relative pose between images may be defined.

A local map may be constructed from the estimated relative pose and the odometry. The local map may include 3D point cloud data (PCD) constructed based on the coordinate system in which the relative pose is estimated.

Furthermore, each point of the point cloud data includes information of the observed image and may include descriptor information of a local feature in the image.

Furthermore, each point of the point cloud data may further include local feature matching information between images. In addition, each point of the point cloud data may further include information such as orientation information, a normal direction, or semantic information of each point.

Referring to FIG. 3, the local map 310 can be associated with database points in previously constructed spatial information 300. The apparatus for estimating the user pose may estimate the user pose by associating the spatial information 300 and the local map 310 with each other.

Furthermore, the local map 310 may be used to infer newly acquired relative pose information of the user.

Furthermore, the local map 310 may be expanded or modified from the newly acquired user information. Alternatively, the newly acquired user information may be added thereto.

The local map 310 may be used to optimize the relative pose between images or the 3D point cloud data position by repeatedly modifying and improving the same using a bundle adjustment technique.

The point cloud data in the local map 310 may be data matching the image 320.

The estimated relative pose information which store therein information used when estimating the relative pose, may include relative pose information between images, the local map, the feature matching information, the global feature formation, or the local feature information, or a combination thereof.

The user pose may be defined as a pose of the image acquisition device (camera) or a pose of a calibrated device.

An image pose refers to a pose of the sensor (camera, etc.) that has acquired the image at the moment the image was acquired.

The user pose may be estimated using only the image in the constructed spatial information.

In this regard, when the pose estimation is performed using only an individual image, the pose may be estimated per each image. The pose estimation may be performed using sequential images or a selected plurality of images.

When estimating the pose of an individual image, for computational efficiency, the similarity between the image data constituting the spatial information and the acquired image information may be calculated, and images of the spatial information with high similarity may be selected.

For example, similarity between global features, similarity between local features, similarity between images in a SSIM (structural similarity index measure) or a scheme similar thereto, similarity of layers of a deep learning model, or similarity of tensors, etc. may be calculated, and the calculated similarity may be considered Similar spatial information images may be converted into an image cluster using simultaneous visibility information.

The pose within the spatial information may be estimated via feature matching between the feature of the acquired image and the feature of the spatial information corresponding to each image cluster.

Alternatively, the pose may be estimated by performing feature matching between the feature of the acquired image and the feature of each image within each selected spatial information without generating the image cluster.

In this regard, when there are multiple image clusters or selected spatial information images, there may be multiple estimated image poses.

A process of considering each pose as a candidate for a final pose and selecting the most suitable pose may be included in the method according to the present disclosure.

Furthermore, for estimation of the pose of an individual image, the feature matching may be performed using the entirety of the spatial information and all feature information therein, such that the pose of the image may be estimated.

Figure 4:
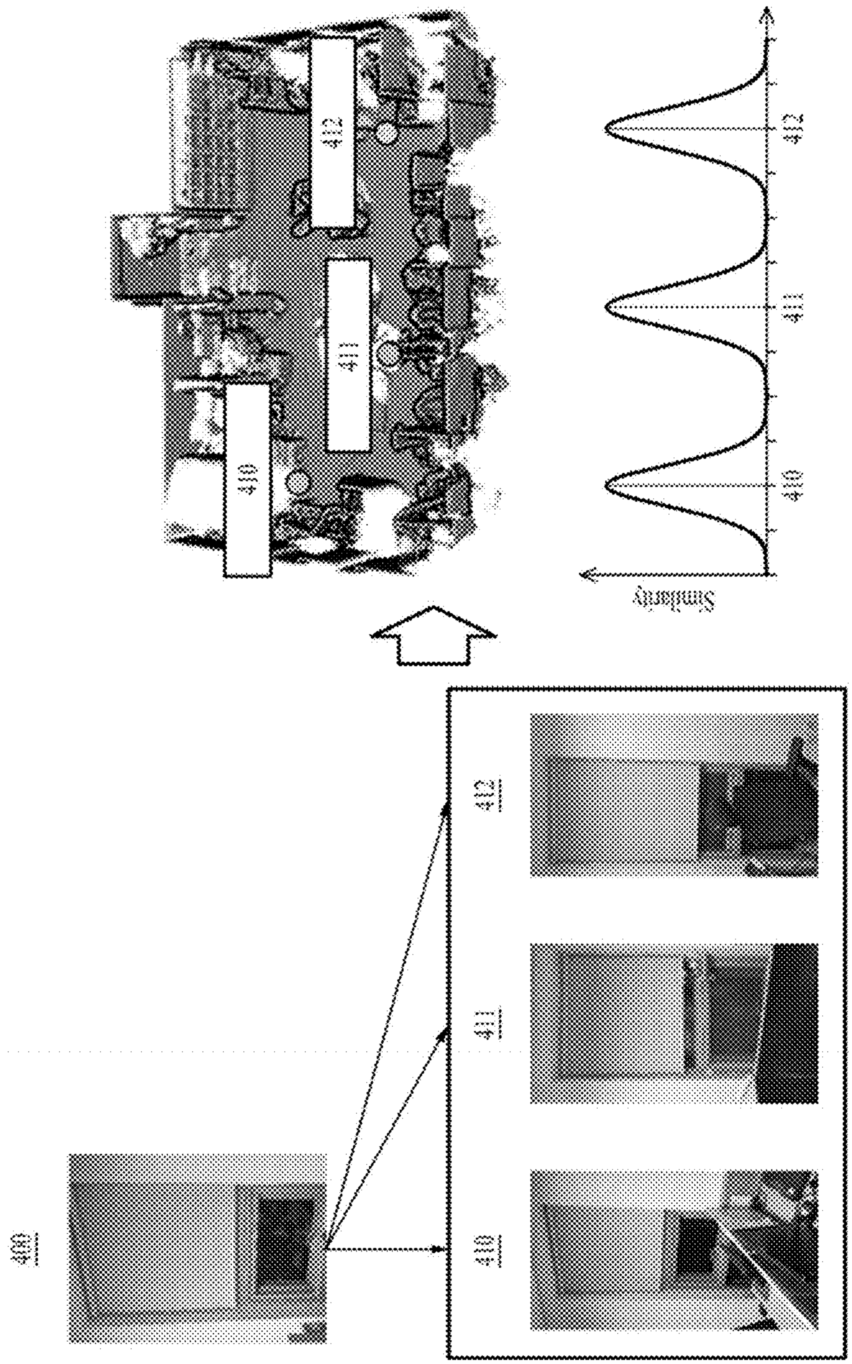
FIGS. 4 to 6 are diagrams illustrating performance improvement in estimating a user pose using user information including a plurality of images acquired sequentially in a chronological order according to an embodiment of the present disclosure.
Figure 5:
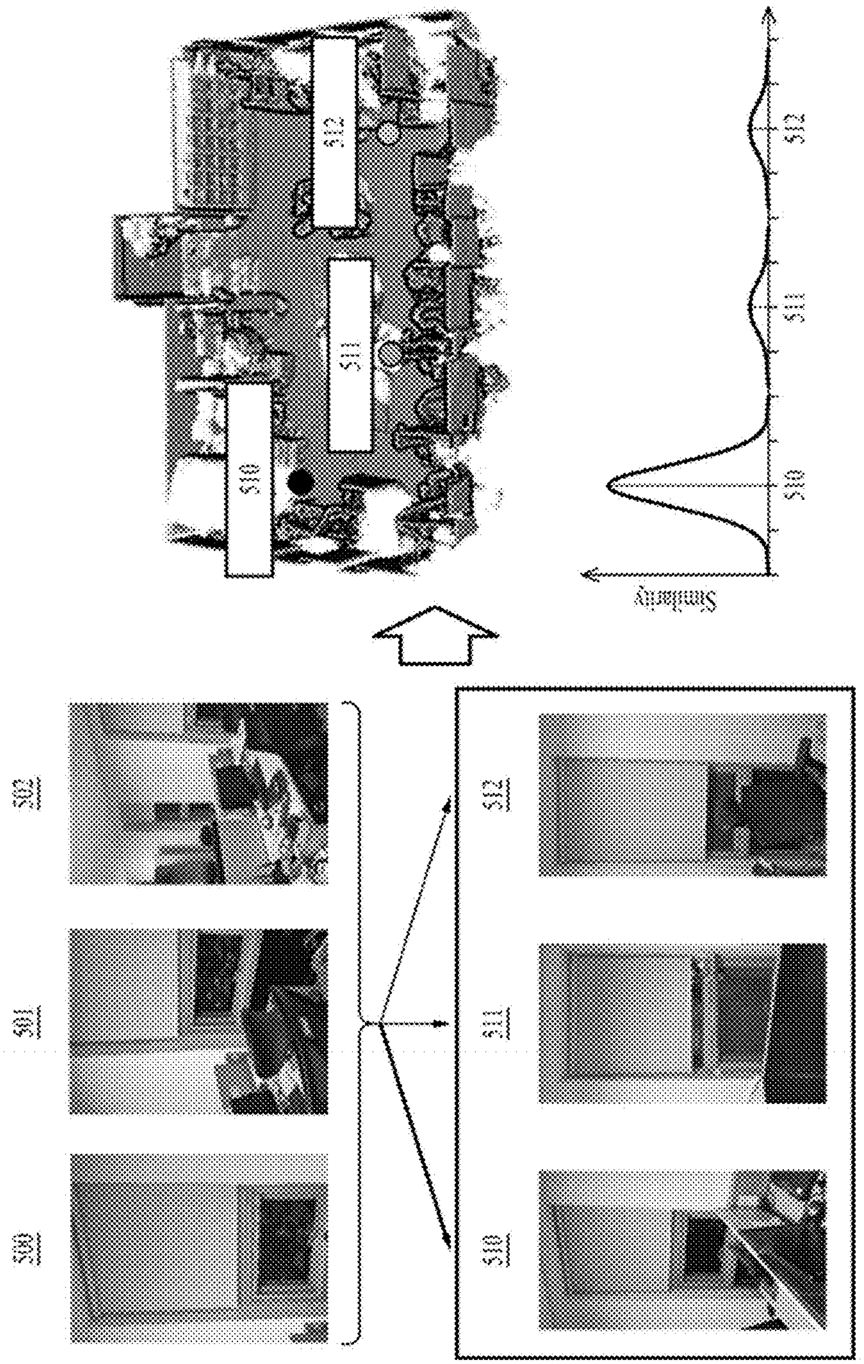
Figure 6:
Figure 6:
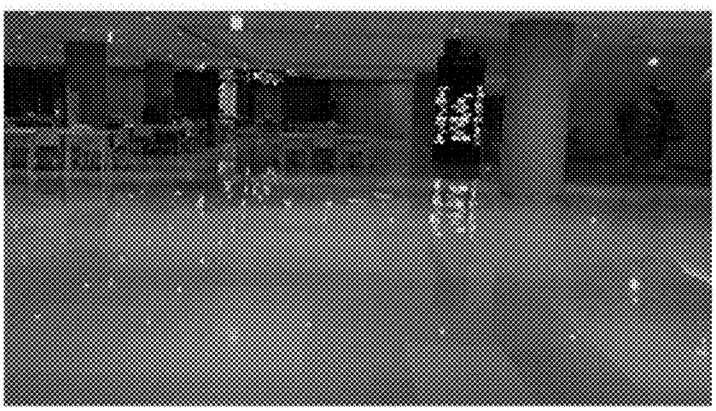

FIGS. 4 to 6 are diagrams illustrating performance improvement in estimating a user pose using user information including a plurality of images acquired sequentially in a chronological order according to an embodiment of the present disclosure.

FIG. 4 illustrates that uncertainty occurs when estimating the pose with a single image in relation to the method for estimating the user pose in accordance with the present disclosure.

Referring to FIG. 4, the user device acquires one image 400 as user information. The apparatus for estimating the user pose estimates a first candidate 410, a second candidate 411, and a third candidate 412, based on the image 400, and calculates the similarity of each of the first candidate 410, the second candidate 411, and the third candidate 412. Based on the calculated similarity, all of the first candidate 410, the second candidate 411, and the third candidate 412 are similar to each other, such that the uncertainty occurs in estimating the user pose.

When using only the image 400, and there are several similar portions to each other in the space, it may not be easy to estimate the correct pose.

FIG. 5 illustrates that uncertainty is removed when estimating the pose with a single image in relation to the method for estimating the user pose in accordance with the present disclosure.

Referring to FIG. 5, the user device acquires a plurality of images 500, 501, and 502 as user information. The apparatus for estimating the user pose estimates a first candidate 510, a second candidate 511, and a third candidate 512 based on the plurality of images 500, 501, and 502, and calculates the similarity of each of the first candidate 510, the second candidate 511, and the third candidate 512, and selects, based on the calculated similarity, the first candidate 510 among the first candidate 510, the second candidate 511, and the third candidate 512, and perform user pose estimation based on the selected first candidate 510.

The plurality of images 500, 501, and 502 may be acquired in a chronological order while moving the user device, and be used for estimating the user pose.

When the plurality of images 500, 501, and 502 is utilized, the uncertainty in the pose estimation in the spatial information may be reduced and thus, the correct pose may be estimated.

FIG. 6 illustrates improving pose accuracy and precision by using a plurality of images to estimate the correct pose within the spatial information in the method for estimating the user pose in the present disclosure.

Referring to FIG. 6, images 600 and 610 have different time-points at which the images 600 and 610 are acquired. When change in the object, object, interior, or lighting as observed in the image occurs due to the different acquisition time-points, it is difficult to estimate the correct pose within the spatial information.

When using the plurality of images, the method and the apparatus according to the present disclosure may find keypoints that are more robust against the change in the space and thus estimate the pose more accurately.

For example, the relative pose between the image 600 and the image 610 having the different acquisition time-points may be used as the estimated relative pose information.

For example, when using the estimated relative pose information, the method and the apparatus according to the present disclosure may generate more robust matching information using the plurality of images than the local feature matching information of spatial information that may be found in a single image, thereby improving pose accuracy and precision.

When estimating the pose using sequential images or the plurality of images, the method and the apparatus according to the present disclosure may select the keyframe and perform the pose estimation only using the image corresponding to the keyframe. Alternatively, the method and the apparatus according to the present disclosure may perform the pose estimation using all images.

For example, when at least one image from the images acquired in a chronological order is used, there may be at least one possible pose candidate for each image.

Figure 7:
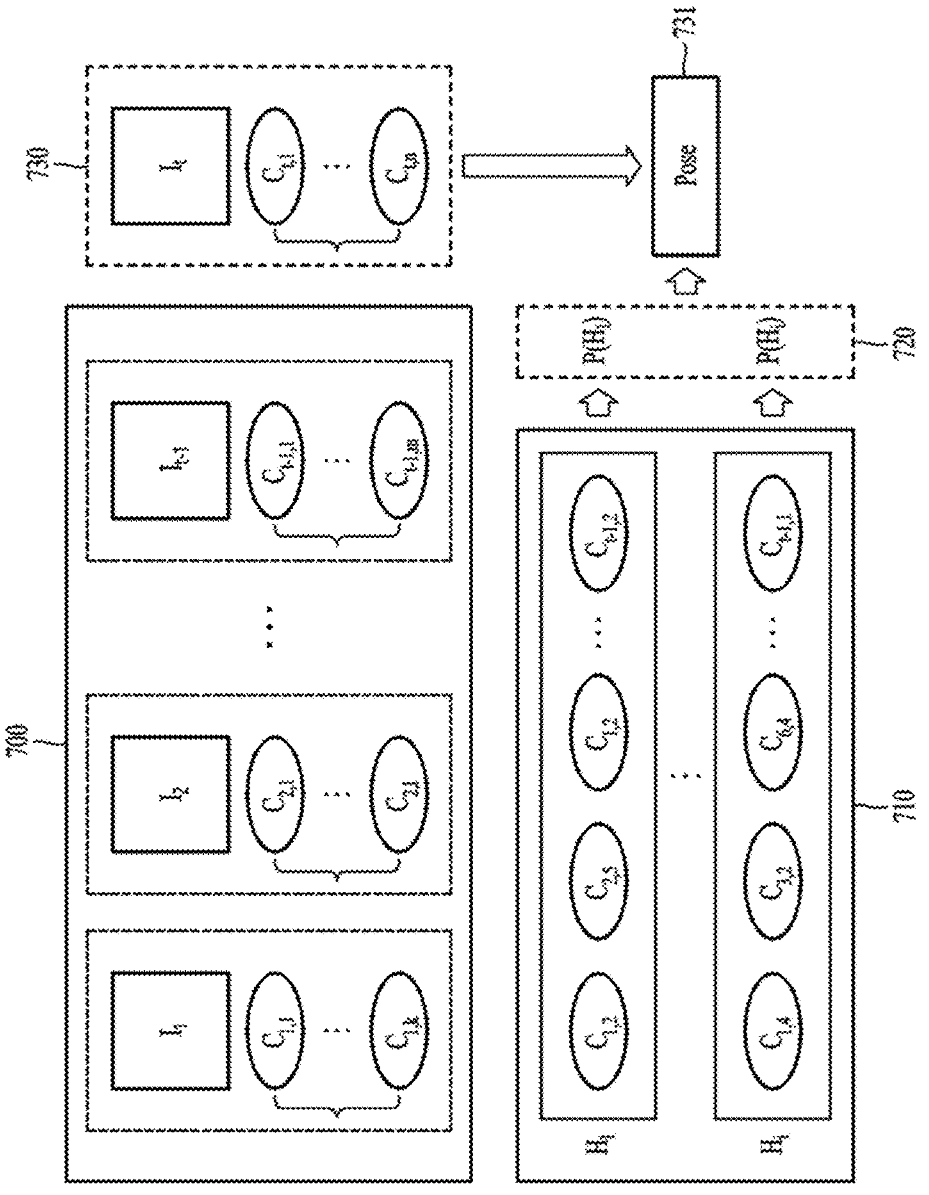
FIG. 7 is a diagram illustrating a method for estimating a user pose by generating a pose hypothesis set based on estimated pose candidate information and estimated relative pose information according to an embodiment of the present disclosure.

FIG. 7 is a diagram illustrating a method for generating a pose hypothesis set based on estimated pose candidate information and estimated relative pose information and estimating a user pose based on the pose hypothesis, according to an embodiment of the present disclosure.

Referring to FIG. 7, in the method for estimating the user pose according to one embodiment of the present disclosure, when the estimated relative pose information may be used, more robust matching information may be generated using multiple images than the local feature matching information of the spatial information that may be found in one image. Thus, the pose accuracy and precision may be improved.

According to one embodiment of the present disclosure, when estimating the pose using the sequential images or the plurality of images, the method for estimating the user pose may select a keyframe, and may perform pose estimation only on the image corresponding to the keyframe, or may perform the pose estimation on all images.

When the method for estimating the user pose uses at least one image among images acquired in the chronological order, a plurality of possible pose candidates may be present for each image.

That is, the method for estimating the user pose sets a plurality of candidates C for each of images $I_1$ to $I_{t-1}$ in the images 700 acquired in the chronological order.

The plurality of candidates may be set using the three-dimensional space model and the plurality of images.

The method for estimating the user pose may associate the estimated relative pose information with each other to generate a hypothesis 710 including a plurality of hypothesis sets H including correct pose candidates.

One hypothesis set H may store therein pose candidates obtained from one or more images, information used when obtaining the pose candidates, and information used when estimating the relative pose.

The method and the apparatus estimating the user pose may associate the newly acquired image information with the hypothesis 710 and may calculate the probability or the score of each hypothesis based on the association result, and may use the calculated probability or score as a criterion 720 for hypothesis selection, and may estimate a final pose 731 related to a target 730 on which the user pose is to be estimated, based on the selected criterion.

For example, the probability or the score at which the hypothesis is correct may be calculated based on an association result between current user pose information that may be inferred from each hypothesis and current sensor information such as the image acquired by the user.

Figure 8:
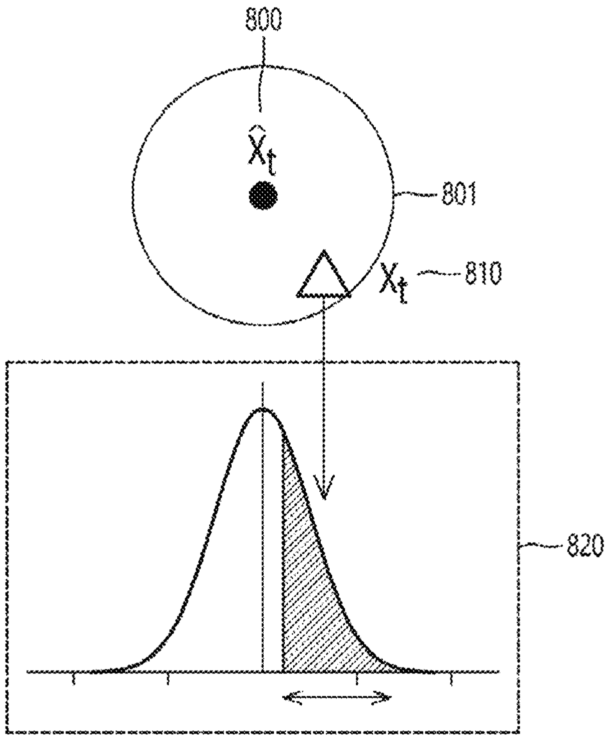
FIG. 8 is a diagram illustrating probability calculation and quantification of user pose estimation based on a user pose via a hypothesis set according to an embodiment of the present disclosure.

FIG. 8 is a diagram illustrating the probability calculation and quantification of user pose estimation based on a user pose using a hypothesis set according to an embodiment of the present disclosure.

Referring to FIG. 8, the probability or score at which the current user pose information that may be inferred based on the user sensor information and each hypothesis is correct may be calculated.

According to one embodiment of the present disclosure, the apparatus for estimating the user pose specifies a position 800 based on the hypothesis, determines a candidate 810 within an error range 801, and calculates a probability 820 at which the candidate 810 matches the user pose information.

The user sensor information that is continuously acquired based on the established hypothesis may be used to predict the user pose. The predicted user pose may be selectively included in the hypothesis to generate a user pose hypothesis.

Furthermore, in associating the estimated relative pose information and the estimated image pose information with each other, the matching information or other sensor information may be used to estimate an actual scale of the local map and the relative pose coordinate system or a scale corresponding to the corresponding hypothesis.

Instead of generating the hypothesis, the method and the apparatus according to the present disclosure may estimate the user pose based on the estimated relative pose information and the estimated pose candidate information from individual images or one or more selected images.

Before estimating the final pose, or after estimating the final pose, refinement, correction, or update may be performed thereon to improve pose accuracy.

In this regard, a pose improvement operation may be performed using the estimated relative pose information or the local map information or the estimated pose candidate information or a combination thereof. For example, the pose accuracy may be improved by updating the matching information of the final pose using the relative pose information.

The method and the apparatus according to the present disclosure may repeat the pose improvement operation at least one time.

A single pose may be estimated using multiple images acquired in a chronological order. For example, the pose may be estimated in the same or similar way to a manner in which the pose is estimated in the single image, using local features expressed using multiple images, one global feature, or a combination thereof. In this regard, the estimated relative pose information may be used to select the final pose or improve the accuracy.

The user sensor information may be continuously acquired until the final pose has been estimated using the image information acquired in the chronological order or the convergence has been determined.

For example, when it is determined that the user's pose possibility has converged to some extent, the final pose may be selected as the corresponding converged pose.

A deep learning model or a neural network may be used to estimate the relative pose or the pose in the spatial information.

Depending on a type of a learning problem, the deep learning may be classified into reinforcement learning, supervised learning, and unsupervised learning.

Training data may be needed in the learning stage, and the training data may be composed of data including the image information and data including the pose at which the data is acquired. In order to increase an amount of the learned data, noise may be added to the above two types of data, or the data may be augmented and modified via data augmentation techniques.

A convolutional neural network (CNN) or all or some of various neural networks may be used. The result of the deep learning may be used to estimate the user pose expected to be the pose at which the user information is acquired or to estimate the relative pose between images.

Image information of user information may be used as an input, and user additional information may be used together therewith. When using the user additional information, the method and the apparatus according to the present disclosure may add a layer to the neural network, change the function, adjust the number of parameters, or change values thereof.

The user pose may be estimated by applying the user information acquired in the chronological order to a particle filter, or techniques such as EKF, EIF and UKF based on the spatial information.

When the inertial information or the odometry is acquired as the user additional information, the estimated user pose may be corrected.

Depending on the sequentially acquired user information, a value of the particle filter may converge to a specific pose. In this regard, a converged point may be estimated to the user pose. When estimating the user pose, a weight may be applied. The user pose may be estimated among multiple convergence points.

The user pose may be estimated by fusing the pose estimated via the deep learning and the pose estimated using the particle filter with each other.

For example, the user pose may be estimated by performing the particle filter around the pose estimated via the deep learning. In the opposite way thereto, the user pose may be estimated by performing the deep learning around the converged pose obtained using the particle filter.

When the user information is acquired by a sensor attached to a wheeled mobile robot instead of the user, the user may control the mobile robot, or the mobile robot may drive autonomously. The user information may be acquired via a combination of the two.

The mobile robot pose may be considered as the user pose. When a coordinate transformation relationship between the mobile robot and the user's field of view is known or the coordinate can be transformed, the mobile robot pose may be converted to the user pose.

The mobile robot may acquire not only the user information including the image, but also the odometry of the mobile robot as the user additional information. The user pose may be corrected using the odometry.

The relative expected pose of the mobile robot may be predicted using sequentially acquired odometry. Information such as a covariance matrix may be calculated using the techniques such as EKF, EIF, UKF, or similar schemes. The method and the apparatus according to the present disclosure may update the information such as the covariance matrix to correct the user pose.

When using the mobile robot, related algorithms to movement, driving, manipulation, movement, data acquisition, storage and processing of the mobile robot may be performed on a robot operating system (ROS).

The space information, the depth-image combined information, the 3D virtual space model, the user information, the user additional information, etc. may be stored and processed in a server.

At the same time as when the spatial information is acquired, the depth-image combined information may be constructed and the three-dimensional virtual space model may be constructed. The user pose may be estimated in real time at the same time as when the user information is acquired. There may be latency. The same may be processed after the user pose acquisition is completed.

The method and the apparatus according to the present disclosure may first acquire the user information and then acquiring the spatial information to construct the 3D virtual space model and then estimate the user pose. Alternatively, the method and the apparatus according to the present disclosure may first acquire the spatial information to construct the 3D virtual space model, and then may acquire the user information and then may estimate the user pose.

The method of the present disclosure may be performed in a system as a combination of a sensor system and a computer, or may be performed in an independent sensor system and computer.

When acquiring the user information, the pose of each measurement device and the pose of the entire user sensor system may be different from each other. However, conversion therebetween may be performed using a coordinate transformation relationship of each measurement device and the sensor system. For example, a center or an appropriate position of the user sensor system may be assumed as the user pose, or the user pose may be assumed based on the user sensor system.

In this case, the necessary calibration information or the relative pose from the user sensor system to the user pose may be known or assumed to be a certain value.

Figure 9:
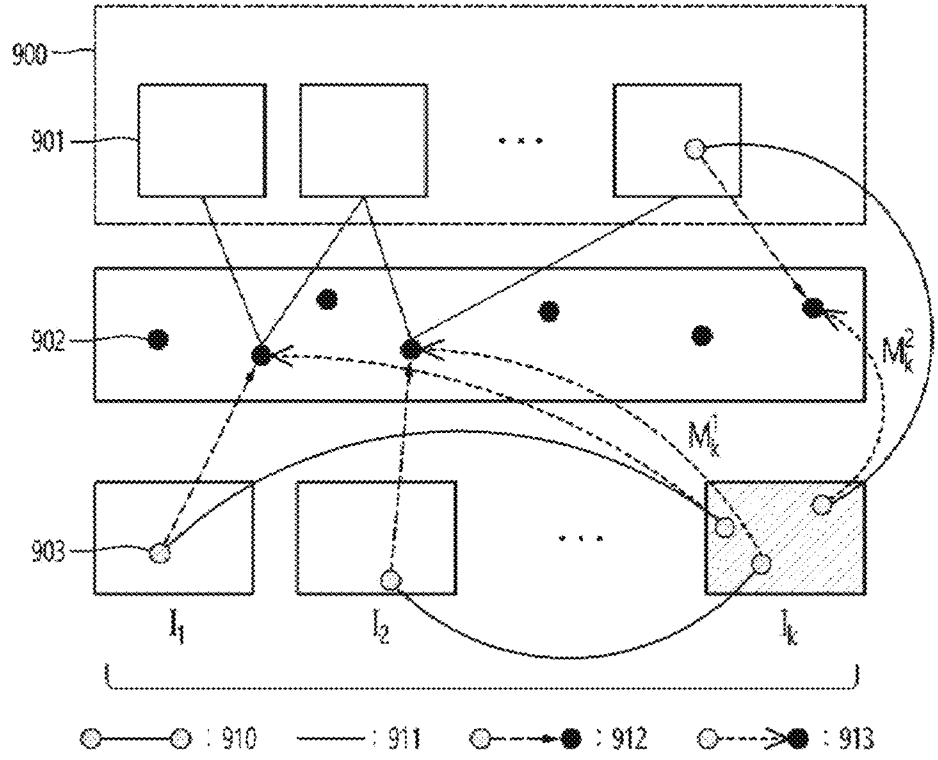
FIG. 9 is a diagram illustrating an example of data utilization based on a plurality of images that are acquired sequentially in a chronological order according to an embodiment of the present disclosure.

FIG. 9 is a diagram illustrating an example of data utilization based on a plurality of images that are acquired sequentially in a chronological order according to an embodiment of the present disclosure.

Referring to FIG. 9, in an example of data utilization based on a plurality of images, sequential data may be utilized for the apparatus for estimating the user pose to find richer 2D-3D function correspondence, $M^1_k$ and $M^2_k$.

$M^1_k$ may be found via 2D-2D local feature matching between corresponding 3D map points found in a PnP- RANSAC process performed during the user pose estimating process using a current keyframe $I_k$ and a previous keyframe of a final hypothesis and a single image.

Furthermore, the method according to the present disclosure observes the 3D map points, and repeats the covisibility clustering, and then searches for a database image to find 2D-3D correspondence $M^2_k$, similar to the user pose estimating process using a single image.

Images 901 representing the spatial information stored in the database constitute a covisibility clustering 900, and the image 901 observes or is mapped to a 3D map point 902. A point 903 in an inquiry image $I_1$, $I_2$ to $I_K$ and the 3D map point 902 are matched with each other. The hypothesis set is generated.

An indicating line 910 may represent matching between two dimensions. An indicating line 911 may represent observation. An indicating line 912 may represent correspondence of the three dimension to the two dimension of the single image. An indicating line 913 indicates correspondence of the three dimension to the two dimension of the sequential images.

In other words, the method for estimating the user pose designs the hypothesis obtained by associating the image 901 representing the spatial information and the 3D map point 902 related to the estimated relative pose information with the inquiry image $I_1$, $I_2$ to $I_K$.

Because the SfM database provides data on the 3D map point 902, the SfM database may support searching for the inquiry image $I_1$, $I_2$ to $I_K$.

The method for estimating the user pose merges all retrieved images with each other and performs the covisibility clustering as described above.

When the covisibility clustering intersects with an original cluster, a default cluster is selected and other clusters are ignored, and a pose $X^1_k$ of a keyframe $I_k$ is estimated.

An image retrieved from the selected cluster is filtered based on a cosine distance of a global descriptor to ensure that the number of images as used does not exceed 150% of a $K_1$ image.

In a similar manner to the pose estimating step, the 2D-3D correspondence with the newly found cluster is found and the correspondence is denoted as $M^2_k$.

The two corresponding sets $M_1$; and $M^2_k$ are combined with each other and a PnP algorithm is applied in a RANSAC loop to output the final pose $X_k$.

Figure 10:
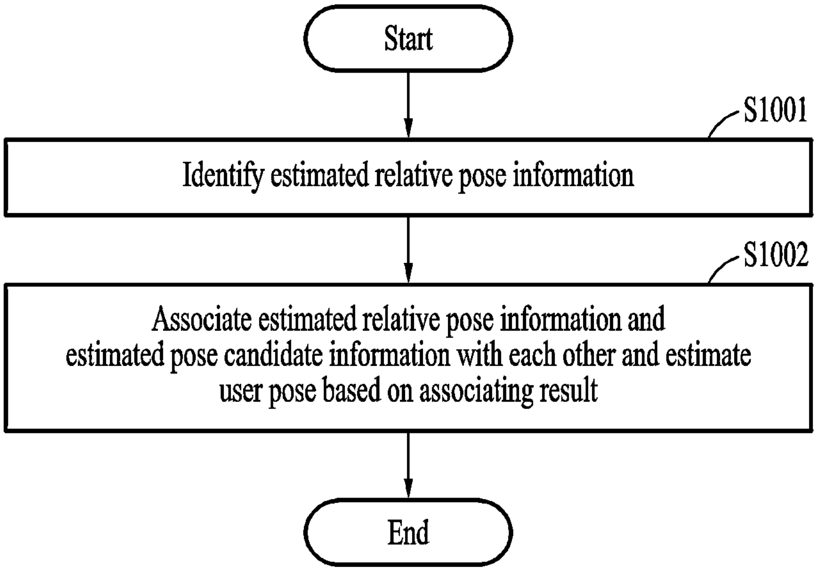
FIG. 10 and FIG. 11 are diagrams for illustrating a method for estimating a user pose in a three-dimensional space according to an embodiment of the present disclosure.
Figure 11:
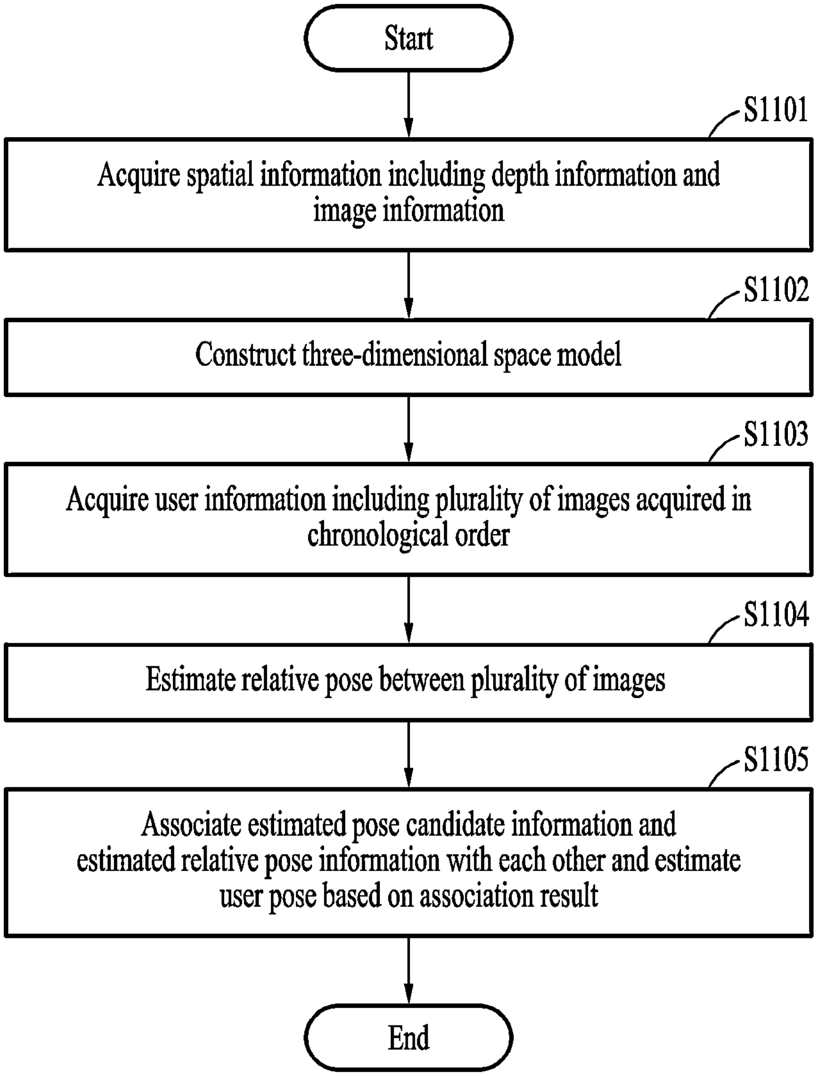

FIG. 10 and FIG. 11 are diagrams for illustrating a method for estimating the user pose in the three-dimensional space according to an embodiment of the present disclosure.

FIG. 10 illustrates a procedure for estimating the user pose in a real space based on the method for estimating the user pose in the three-dimensional space according to an embodiment of the present disclosure.

Referring to FIG. 10, in step S1001, the method for estimating the user pose in the three-dimensional space according to an embodiment of the present disclosure identifies the estimated relative pose information.

In other words, the method for estimating the user pose in the three-dimensional space according to an embodiment of the present disclosure may identify the estimated relative pose information between the plurality of images acquired in a chronological order in the real space.

In step S1002, the method for estimating the user pose in the three-dimensional space according to an embodiment of the present disclosure associates the estimated relative pose information and the estimated pose candidate information with each other and estimates the user pose based on the associating result.

In other words, the method for estimating the user pose in the three-dimensional space according to an embodiment of the present disclosure may acquire a three-dimensional space model constructed using spatial information including at least one of inertial information, depth information, and image information about the real space; may generate estimated pose candidate information based on the acquired three-dimensional space model; may associate the identified estimated pose candidate information and the estimated relative pose information with each other; and may estimate the user pose based on the association result.

Therefore, the apparatus and the method for estimating the user pose in a three-dimensional space according to the present disclosure may improve the accuracy and robustness at which the user pose is estimated by using sensor information of the user device acquired in a chronological order including sequential image information in association with individual image information and spatial information to utilize a larger amount of information than that as may be obtained using a single image or a single piece of information.

FIG. 11 illustrates the procedure for estimating the user pose in the real space using sequential image information and three-dimensional spatial information in the method for estimating the user pose in the three-dimensional space according to an embodiment of the present disclosure.

Referring to FIG. 11, the method for estimating the user pose in the three-dimensional space acquires the spatial information including the depth information and the image information in step S1101.

In other words, the method for estimating the user pose in the three-dimensional space may acquire the spatial information including at least one of inertial information, depth information, and image information about the real space.

In step S1102, the method for estimating the user pose in the three-dimensional space constructs the three-dimensional space model.

In other words, the method for estimating the user pose in the three-dimensional space may construct the three-dimensional space model including three-dimensional information about the plurality of features using the spatial information acquired in step S1101.

In step S1103, the method for estimating the user pose in the three-dimensional space acquires the user information including the plurality of images acquired in the chronological order.

In other words, the method for estimating the user pose in the three-dimensional space may acquire the user information including the plurality of images acquired in the chronological order based on the user device in the real space.

In step S1104, the method for estimating the user pose in the three-dimensional space estimates the relative pose between the plurality of images.

In other words, the method for estimating the user pose in the three-dimensional space may estimate the relative pose between the plurality of images to generate the estimated relative pose information.

In step S1105, the method for estimating the user pose in the three-dimensional space associates the estimated pose candidate information and the estimated relative pose information with each other and estimates the user pose based on the association result.

In other words, the method for estimating the user pose in the three-dimensional space generates the estimated pose candidate information based on the three-dimensional space model constructed in step S1102, and associates the identified estimated pose candidate information and the estimated relative pose information with each other to generate the pose hypothesis set, and estimate the user pose using the generated pose hypothesis set.

In other words, the method for estimating the user pose in the three-dimensional space may apply the estimated relative pose information to the estimated pose candidate information representing the user pose candidate related to the real space and determine the pose candidate in a frame represented by the image based on the application result. This process may be repeated using the plurality of images to set a plurality of the pose hypothesis sets. The similarity and the probability score on each of the set pose hypothesis sets may be calculated and the user pose may be estimated based on the calculation result.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents. Therefore, other embodiments, other examples, and equivalents to the claims are within the scope of the following claims.

What is claimed is:

1. An apparatus for estimating a user pose in a three-dimensional space, the apparatus comprising:

a relative pose identification unit configured to identify estimated relative pose information between a plurality of images acquired in a chronological order in a real space; and a user pose estimating unit configured to:

acquire a three-dimensional space model constructed using spatial information including at least one of inertial information, depth information, and image information about the real space;

generate estimated pose candidate information based on the acquired three-dimensional space model;

associate the identified estimated pose candidate information and the estimated relative pose information with each other; and estimate the user pose based on the association result, wherein the user pose estimating unit is configured to:

calculate a similarity between the image information constituting the three-dimensional space model and the plurality of images;

construct an image cluster based on the calculated similarity;

match features corresponding to the image cluster with features of one image among the plurality of images:

generate pose candidates from poses estimated via the feature matching on each image cluster; and generate the estimated pose candidate information on the generated pose candidates.

2. The apparatus of claim 1, wherein the estimated relative pose information is generated by:

estimating a relative pose from the plurality of images based on a 3D local map constructed using a local feature as keypoint information between the plurality of images;

defining an origin and an orientation of a relative coordinate system; and selectively estimating a relative pose to a keyframe selected relative to the plurality of images.

3. The apparatus of claim 1, wherein the user pose estimating unit is configured to:

associate the estimated relative pose information and the estimated pose candidate information with each other to generate a pose hypothesis set;

calculate a probability and/or a score from the generated pose hypothesis set; and estimate the user pose based on the calculated probability and score.

4. The apparatus of claim 3, wherein the user pose estimating unit is configured to:

establish a scale hypothesis as an actual measurement ratio of a local map, using local map information based on the estimated relative pose information and feature matching information based on the estimated pose candidate information; and generate the pose hypothesis set in consideration of convergence on each of the plurality of images with respect to the established scale hypothesis.

5. The apparatus of claim 4, wherein the user pose estimating unit is configured to generate:

a first pose hypothesis set in which one pose candidate among a plurality of pose candidates related to a first image among the plurality of images is selected, one pose candidate among a plurality of pose candidates related to a second image among the plurality of images is selected, and one pose candidate among a plurality of pose candidates related to a last image among the plurality of images is selected; and a second pose hypothesis set in which another pose candidate other than the one pose candidate among the plurality of pose candidates related to the first image among the plurality of images is selected, another pose candidate other than the one pose candidate among the plurality of pose candidates related to the second image among the plurality of images is selected, and another pose candidate other than the one pose candidate among the plurality of pose candidates related to the last image among the plurality of images is selected.

6. The apparatus of claim 1, wherein the spatial information is acquired using at least one of a depth measurement device, an image acquisition device, a wireless communication device, an inertial device, or a position information measurement device.

7. The apparatus of claim 1, wherein the three-dimensional space model reconstructs a pose or 3-dimensional point cloud data of a device having acquired the spatial information, and uses a global feature expressing an image included in a plurality of features in a form of information, a local feature including keypoint information, and three-dimensional information, wherein the three-dimensional information includes at least one of a three-dimensional position, an orientation, a normal direction, or semantic information.

8. A method for estimating a user pose in a three-dimensional space, the method comprising:

identifying, by a relative pose identification unit, estimated relative pose information between a plurality of images acquired in a chronological order in a real space;

acquiring, by a user pose estimating unit, a user pose estimating unit a three-dimensional space model constructed using spatial information including at least one of inertial information, depth information, and image information about the real space;

generating, by the user pose estimating unit, estimated pose candidate information based on the acquired three-dimensional space model;

associating, by the user pose estimating unit, the identified estimated pose candidate information and the estimated relative pose information with each other; and estimating, by the user pose estimating unit, the user pose based on the association result, wherein generating, by the user pose estimating unit, the estimated pose candidate information includes:

calculating a similarity between the image information constituting the three-dimensional space model and the plurality of images;

constructing an image cluster based on the calculated similarity:

matching features corresponding to the image cluster with features of one image among the plurality of images;

generating pose candidates from poses estimated via the feature matching on each image cluster; and generating the estimated pose candidate information on the generated pose candidates.

9. The method of claim 8, wherein the estimated relative pose information is generated by:

estimating a relative pose from the plurality of images based on a 3D local map constructed using a local feature as keypoint information between the plurality of images;

defining an origin and an orientation of a relative coordinate system; and selectively estimating a relative pose to a keyframe selected relative to the plurality of images.

10. The method of claim 8, wherein associating, by the user pose estimating unit, the identified estimated pose candidate information and the estimated relative pose information with each other, and estimating, by the user pose estimating unit, the user pose based on the association result include:

associating the estimated relative pose information and the estimated pose candidate information with each other to generate a pose hypothesis set;

calculating a probability and/or a score from the generated pose hypothesis set; and estimating the user pose based on the calculated probability and score.

11. The method of claim 10, wherein generating the pose hypothesis set includes:

establishing a scale hypothesis as an actual measurement ratio of a local map, using local map information based on the estimated relative pose information and feature matching information based on the estimated pose candidate information; and generating the pose hypothesis set in consideration of convergence on each of the plurality of images with respect to the established scale hypothesis.

12. The method of claim 11, wherein generating the pose hypothesis set includes:

generating a first pose hypothesis set in which one pose candidate among a plurality of pose candidates related to a first image among the plurality of images is selected, one pose candidate among a plurality of pose candidates related to a second image among the plurality of images is selected, and one pose candidate among a plurality of pose candidates related to a last image among the plurality of images is selected; and generating a second pose hypothesis set in which another pose candidate other than the one pose candidate among the plurality of pose candidates related to the first image among the plurality of images is selected, another pose candidate other than the one pose candidate among the plurality of pose candidates related to the second image among the plurality of images is selected, and another pose candidate other than the one pose candidate among the plurality of pose candidates related to the last image among the plurality of images is selected.

* * * * *